United States Patent
Kiely

(10) Patent No.: US 12,372,032 B1
(45) Date of Patent: Jul. 29, 2025

(54) GAS TURBINE ENGINE WITH CONTROLLED RETURN OF FUEL TO POWER ACCESSORIES AND RETROFITTING METHOD

(71) Applicant: RTX Corporation, Farmington, CT (US)

(72) Inventor: David Christopher Kiely, Easthampton, MA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/791,726

(22) Filed: Aug. 1, 2024

(51) Int. Cl.
| | |
|---|---|
| F02C 7/36 | (2006.01) |
| F02C 3/107 | (2006.01) |
| F02C 7/22 | (2006.01) |
| F02C 7/236 | (2006.01) |
| F02C 7/32 | (2006.01) |
| F02C 9/28 | (2006.01) |
| F02C 9/30 | (2006.01) |

(52) U.S. Cl.
CPC .............. *F02C 7/36* (2013.01); *F02C 7/32* (2013.01); *F02C 9/28* (2013.01); *F02C 3/107* (2013.01); *F02C 7/22* (2013.01); *F02C 7/236* (2013.01); *F02C 9/30* (2013.01); *F05D 2220/76* (2013.01); *F05D 2220/764* (2013.01); *F05D 2240/35* (2013.01)

(58) Field of Classification Search
CPC combination set(s) only.
See application file for complete search history.

(56) References Cited

U.S. PATENT DOCUMENTS

| | | | |
|---|---|---|---|
| 4,760,696 A | 8/1988 | Rooks et al. | |
| 8,286,432 B2 | 10/2012 | Anson | |
| 2006/0260323 A1* | 11/2006 | Moulebhar | F02C 6/08 60/793 |
| 2011/0030385 A1* | 2/2011 | Ellans | F02C 6/206 60/786 |
| 2013/0098058 A1* | 4/2013 | Sheridan | F01D 25/18 60/783 |
| 2016/0097328 A1* | 4/2016 | Wintgens | F02C 7/32 415/123 |
| 2018/0171815 A1* | 6/2018 | Suciu | F01D 15/10 |
| 2018/0283281 A1* | 10/2018 | Veilleux, Jr. | F02C 7/36 |
| 2020/0300169 A1* | 9/2020 | Turney | F02C 7/236 |
| 2021/0293182 A1 | 9/2021 | Nako et al. | |
| 2022/0381267 A1 | 12/2022 | Clements | |

* cited by examiner

*Primary Examiner* — Binh Q Tran

(74) *Attorney, Agent, or Firm* — Carlson, Gaskey & Olds, P.C.

(57) ABSTRACT

A retrofit gas turbine engine includes a compressor, a combustor and a turbine. A tie shaft is connected to rotate by the turbine, and provide rotational drive into a gearbox. At least one fuel pump is connected to be driven by the gearbox. The at least one fuel pump delivers fuel downstream toward the combustor, and also has a return line. An added accessory turbine is positioned on the return line, and drives an added accessory which has been retrofit added to an existing gas turbine engine. A method is also disclosed.

20 Claims, 7 Drawing Sheets

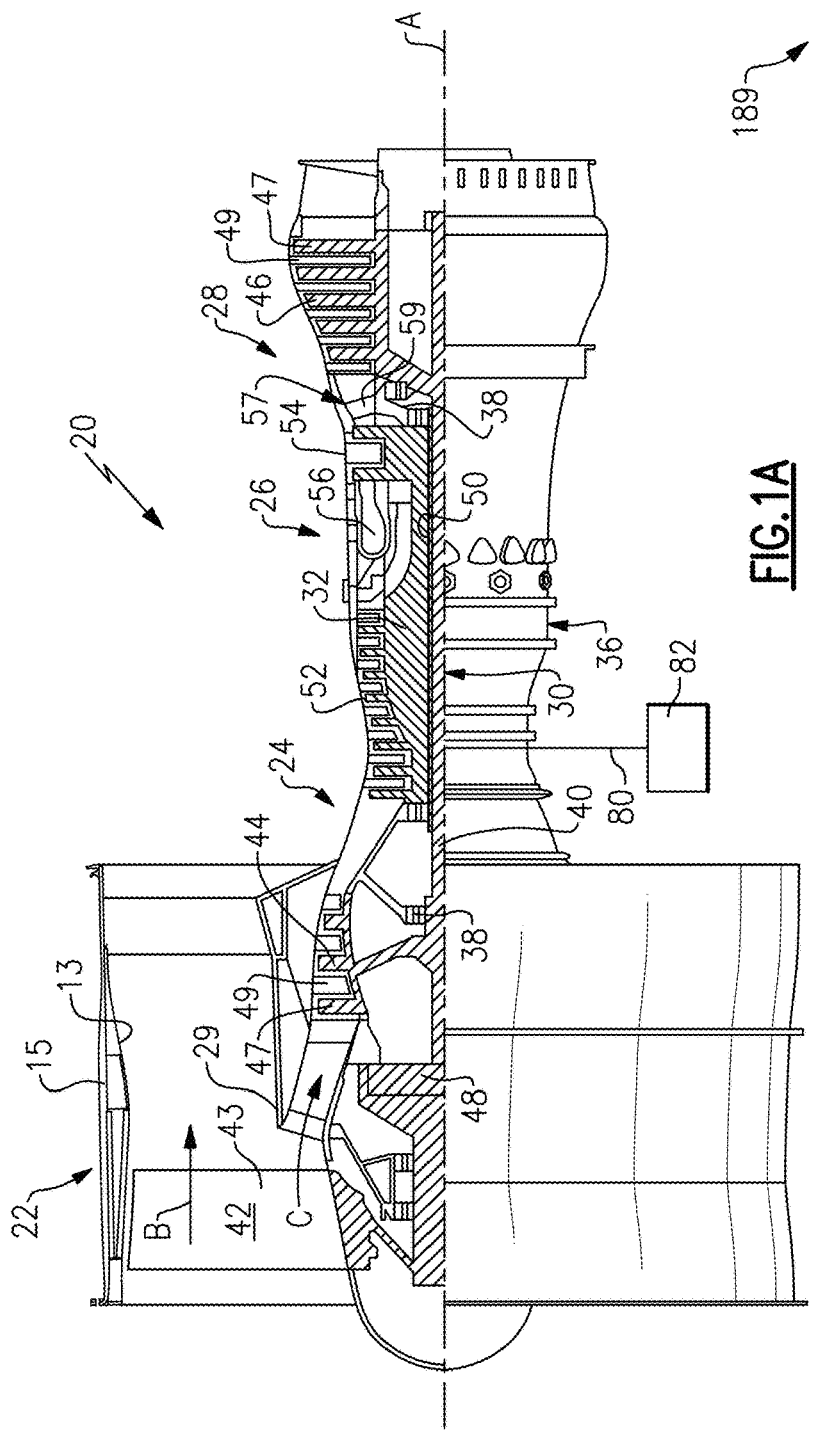
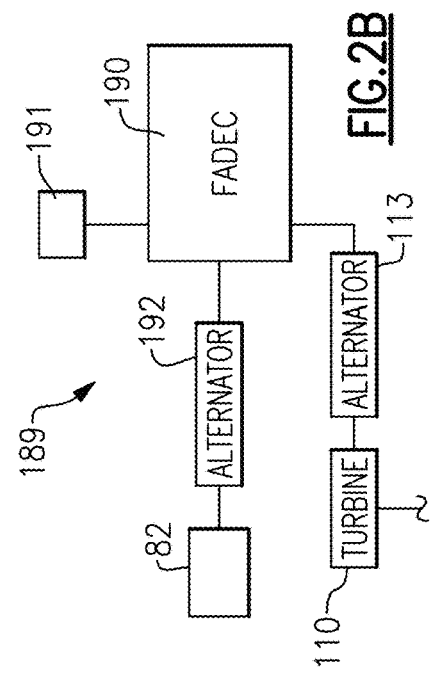
FIG.1A
FIG.2B

GAS TURBINE ENGINE WITH CONTROLLED RETURN OF FUEL TO POWER ACCESSORIES AND RETROFITTING METHOD

BACKGROUND

This application relates to a method of retrofitting additional accessories into a gas turbine engine, and to a gas turbine engine having accessories which are driven by a return of fuel downstream of a fuel pump.

Gas turbine engines are known, and typically include a propulsor delivering air into a bypass duct as propulsion air. The propulsor also delivers air into a core engine including a compressor section, a combustor and a turbine section. The air is compressed in the compressor, delivered into the combustor, mixed with fuel and ignited. Products of this combustion pass downstream over turbine rotors, driving them to rotate.

Gas turbine engines typically have a tie shaft which is driven to rotate by the rotors to provide a source of rotation into a gearbox. Various accessories are then driven off of the gearbox.

One system in gas turbine engines is a fuel supply system for supplying fuel to a combustor.

The fuel supply system typically includes a fuel pump driven through the gearbox, to deliver fuel to the combustor. In addition, the fuel may be returned when there is excess fuel being delivered. As an example, the flow of fuel to the combustor must be higher at higher power operation, such as takeoff, than it would typically be as lower power operation such as cruise of an associated aircraft. The returned fuel has been pressurized by a fuel pump, and it is known to place a turbine in the return line to capture the energy from the pressurized fuel, and drive accessories.

As gas turbine engines become more sophisticated, it may be desirable to add accessories to an existing engine. It would be unduly complex and expensive to change the gearbox to provide a separate drive for a new accessory.

SUMMARY

In a featured embodiment, a retrofit gas turbine engine includes a compressor, a combustor and a turbine. A tie shaft is connected to rotate by the turbine, and provide rotational drive into a gearbox. At least one fuel pump is connected to be driven by the gearbox. The at least one fuel pump delivers fuel downstream toward the combustor, and also has a return line. An added accessory turbine is positioned on the return line, and drives an added accessory which has been retrofit added to an existing gas turbine engine.

In another embodiment according to the previous embodiment, the gas turbine engine is controlled by a full authority digital electronic controller ("FADEC"), the gearbox is connected for driving a first alternator to supply electric power to the FADEC, and the added accessory is a hydraulically driven second alternator to supply additional electric power to the FADEC.

In another embodiment according to any of the previous embodiments, the gas turbine engine further includes an augmenter, and the at least one fuel pump includes an augmenter fuel pump to deliver fuel to the augmenter, with the return line positioned downstream of the augmenter fuel pump to return fuel across the added accessory turbine to drive the added accessory.

In another embodiment according to any of the previous embodiments, the added accessory is a weapon system.

In another embodiment according to any of the previous embodiments, the augmenter fuel pump is ran intermittently and a control for the augmenter fuel pump is modified to provide fuel when the augmenter is not being ran such that the return line downstream of the augmenter fuel pump can power the added accessory turbine and the added accessory.

In another embodiment according to any of the previous embodiments, the augmenter fuel pump is ran constantly.

In another embodiment according to any of the previous embodiments, the at least one fuel pump includes a main fuel pump, and an actuator fuel pump for supplying pressurized fuel to actuators associated with the gas turbine engine, and the actuator fuel pump having the return line passing through the added accessory turbine to in turn drive the added accessory.

In another embodiment according to any of the previous embodiments, the actuator fuel pump is a gear pump.

In another embodiment according to any of the previous embodiments, a thermal recirculation valve recirculates fuel into the return line if a temperature of the fuel exceeds a desired level.

In another embodiment according to any of the previous embodiments, the at least one fuel pump is driven constantly, and a control for the at least one fuel pump has a schedule of volume and pressure values for the fuel to be supplied toward the combustor based upon a condition of an associated aircraft, and the control is modified to provide excess fuel above the schedule values.

In another featured embodiment, a gas turbine engine includes a compressor, a combustor and a turbine. A tie-shaft is connected to rotate by the turbine, and to provide drive into a gearbox. At least one fuel pump is connected to be driven by the gearbox. The at least one fuel pump delivers fuel downstream toward the combustor and also has a return line. A full authority digital electronic controller ("FADEC") receives electrical power from a first alternator. An alternator turbine is positioned on the return line and drives a second alternator which also supplies electric power to the FADEC.

In another featured embodiment, a method of retrofitting an existing gas turbine engine includes the steps of 1) determining a need for an additional accessory to be added to an existing gas turbine engine, and 2) modifying a fuel supply system for the existing gas turbine engine such that a return line downstream of a fuel pump in the fuel supply system returns fuel across an added accessory turbine to drive the additional accessory.

In another embodiment according to any of the previous embodiments, the existing gas turbine engine is controlled by a full authority digital electronic controller ("FADEC"), and a gearbox drives a first alternator supplying electric power to the FADEC, and the additional accessory is a hydraulically driven second alternator supplying additional electric power to the FADEC.

In another embodiment according to any of the previous embodiments, the gas turbine engine further includes an augmenter, and an augmenter fuel pump delivers fuel to the augmenter, with the return line positioned downstream of the augmenter fuel pump, and returning fuel across the added accessory turbine to drive the additional accessory.

In another embodiment according to any of the previous embodiments, wherein the additional accessory is a weapon system.

In another embodiment according to any of the previous embodiments, the augmenter is ran intermittently and a control for the augmenter fuel pump is modified to provide fuel when the augmenter is not being used such that the return line powers the added accessory turbine and the additional accessory.

In another embodiment according to any of the previous embodiments, the augmenter fuel pump is ran constantly.

In another embodiment according to any of the previous embodiments, the fuel pump includes a main fuel pump, and an actuator fuel pump supplies pressurized fuel to actuators associated with the gas turbine engine, and the actuator fuel pump has the return line passing across the added accessory turbine to in turn drive the additional accessory.

In another embodiment according to any of the previous embodiments, the fuel pump is driven constantly, and a control for the fuel pump has an original schedule of volume and pressure for the fuel to be supplied toward the combustor based upon a condition of an associated aircraft, and the control is modified to provide excess fuel above the schedule values.

In another embodiment according to any of the previous embodiments, a thermal recirculation valve recirculates fuel into the return line if a temperature of the fuel exceeds a desired level.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 1A schematically shows a first type gas turbine engine.

FIG. 2B shows an example accessory arrangement.

DETAILED DESCRIPTION

Figure 1B:
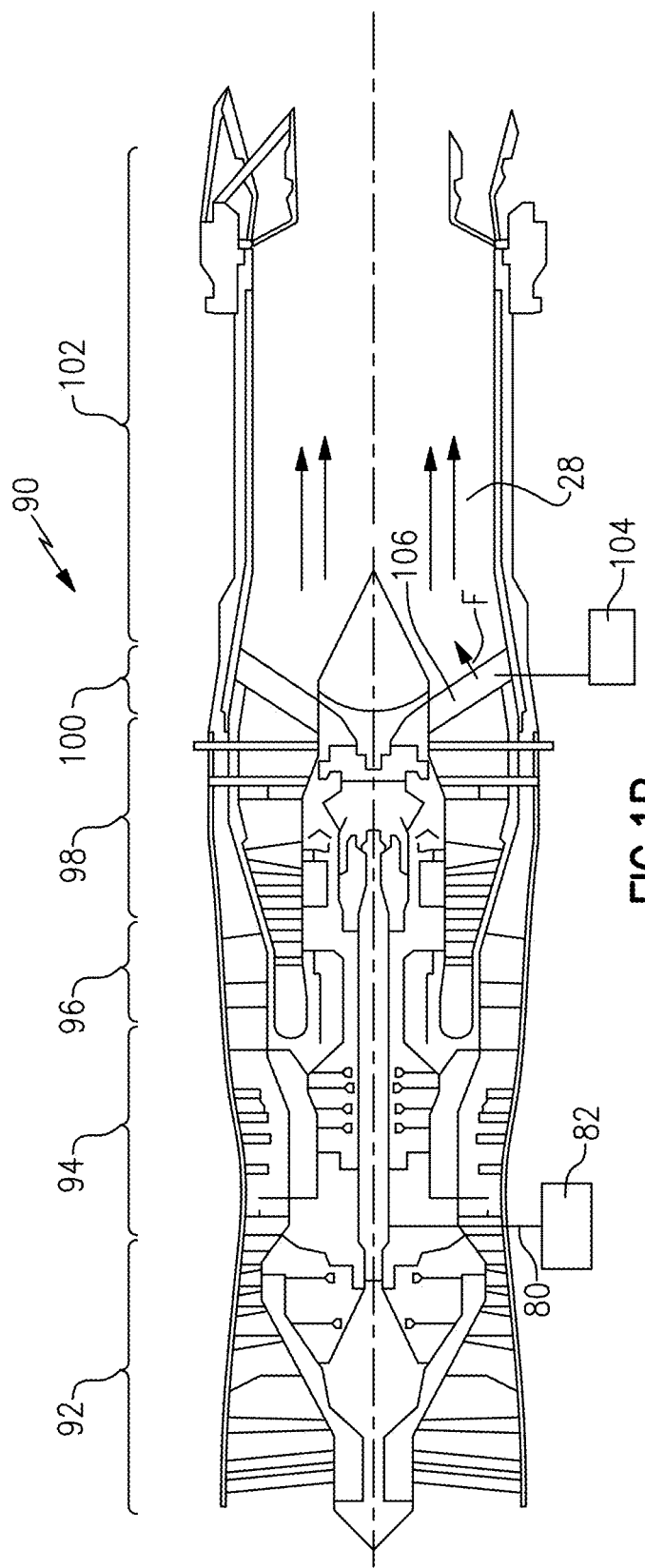
FIG. 1B schematically shows a second type gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7\ °R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

As known, a tie shaft 80 is driven by a shaft in the gas turbine engine 20, and drives a gearbox 82.

FIG. 1A is a so-called commercial engine, such as may be utilized for passenger aircraft.

FIG. 1B shows a military engine 90. A propulsor section 92 delivers air into a compressor section 94. A combustor section 96 receives the compressed air and ignites it. Products of the combustion pass downstream over turbine rotors in a turbine section 98 driving them to rotate. An augmenter section 100 is included to provide additional power from the engine 90 under certain conditions. As an example, the augmenter section 100 is actuated when it is desired to drive the aircraft associated with the engine 90 at very high speed. The augmenter section 100 is schematically shown in a strut 106 receiving fuel from a fuel pump 104. The fuel pump 104 delivers fuel as shown at F into an exhaust stream where it will be ignited.

A tie-shaft 80 drives a gear box 82 to power accessories.

Figure 1C:
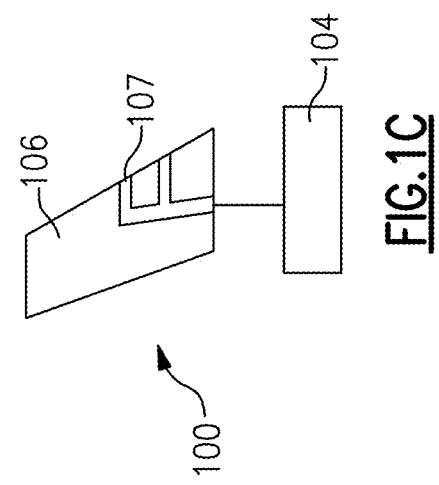
FIG. 1C shows a portion of the FIG. 1B engine.

FIG. 1C shows a detail of an augmenter section 100, including the fuel pump 104 and fuel passages 107 in the strut 106.

Figure 2A:
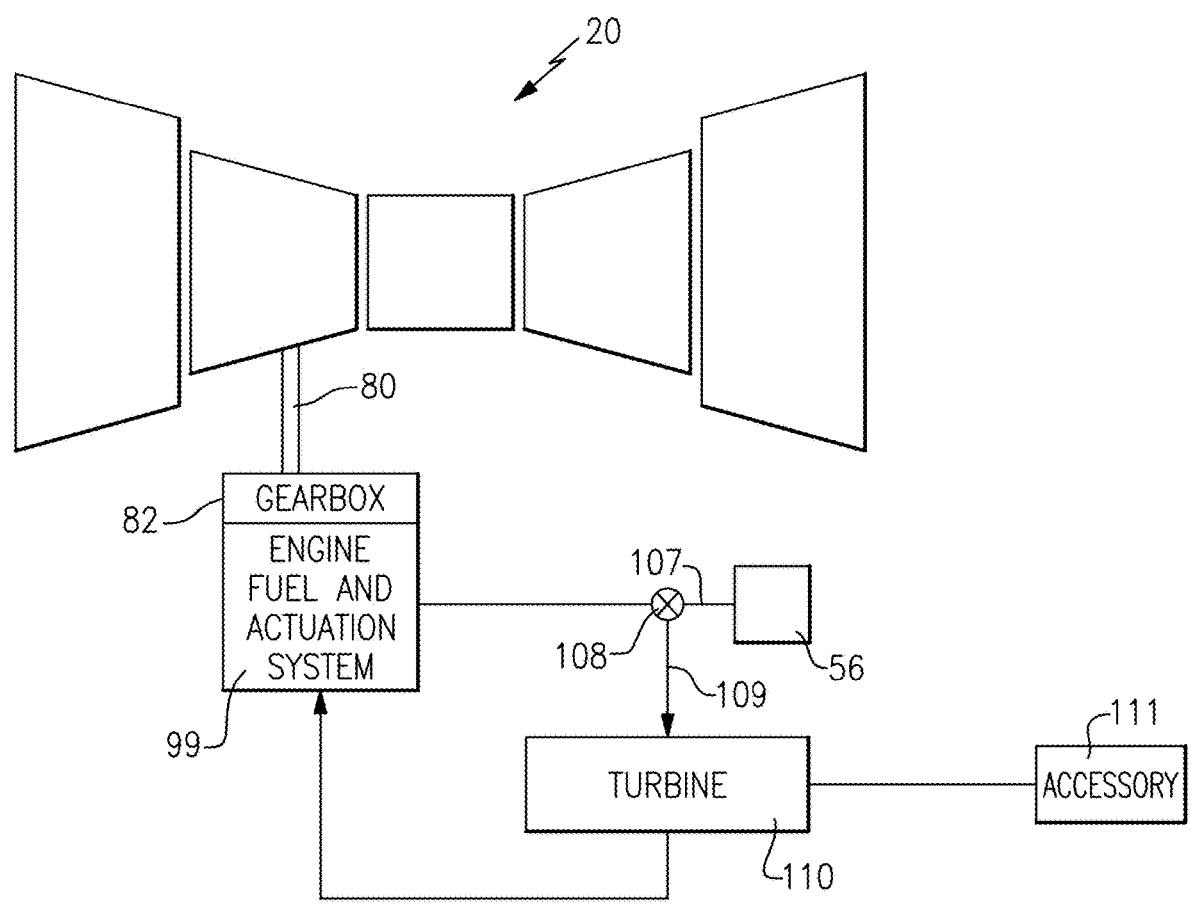
FIG. 2A shows a first arrangement for a gas turbine engine under this disclosure.

FIG. 2A shows the engine 20 having the gearbox 82 driven by the tie shaft 80.

A fuel supply system and actuation system 99 is shown schematically delivering compressed fuel downstream of the fuel pump towards a line 107 leading to the combustor 56. A valve 108 selectively returns a portion of the fuel downstream of the pump to a return line 109, which may return the fuel to a fuel tank.

This fuel has been pressurized by a pump, and thus the return fuel in line 109 is passed over a turbine 110 which captures the energy from the pressurized fuel and utilizes this to drive an accessory 111.

As mentioned above, as gas turbine engines become more complex, it is often desirable to add a supplemental accessory. A feature of this disclosure is that it facilitates retro-fitting of an existing engine with additional accessories.

One such system 189 is shown in FIG. 2B. In FIG. 2B the gearbox 82 is shown driving a permanent magnet alternator 192 to generate electricity to power a control 190 which is illustrated as a full authority digital electronic controller ("FADEC"). This portion of the system 189 is found in existing engines.

As gas turbine engines become more sophisticated the FADEC 190 communicates with more and more sensors and accessories, shown schematically at 191. The added accessories may be actuation systems to control variable geometries. Actuation systems have EHSVs (electric hydraulic servo valves) which include torque motors. Torque motors are one of the largest power draws for the FADEC. Thus, FADEC must control more and more actuation systems, EHSV, solenoids etc.

Moreover, additional computing and control occurs in the FADEC 190. Thus, the alternator 192 that exists on the engine may not supply sufficient power.

Here, the FIG. 2A turbine 110 is shown driving another alternator 113 to provide additional power to the FADEC 190. In this manner the FADEC can provide additional controls and communicate with additional accessories. In this way, the engine is retrofit to further power the FADEC 190.

While one added accessory is disclosed, other accessories may be added. As examples, see below.

Figure 3:
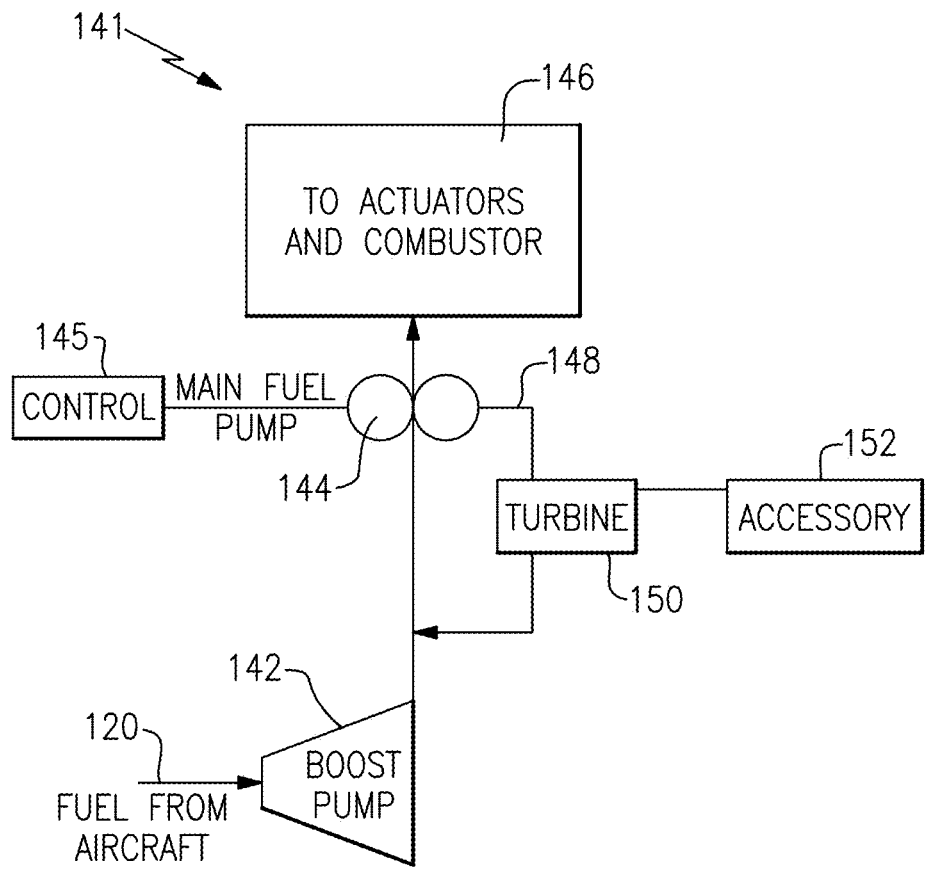
FIG. 3 shows a more sophisticated arrangement under this disclosure.

FIG. 3 shows a fuel supply system 141 which receives fuel at line 120 from a fuel tank. That fuel is delivered to a boost pump 142 which passes the fuel to a main fuel pump 144, which may be a gear pump. A control 145 controls the main fuel pump 144. Main fuel pump 144 supplies fuel to the combustor and to various accessories such as actuators, shown schematically at 146. When main fuel pump 144 is moving excess fuel, some fuel is returned through a return line 148. A turbine 150 is placed on this line, and the turbine drives an accessory 152.

The pump 144 here is shown as a continuous use pump. As will be disclosed below, the control 145 may be modified to provide power for added accessories, and such that the fuel system intentionally provides additional return fuel to power the accessory 152.

Figure 4:
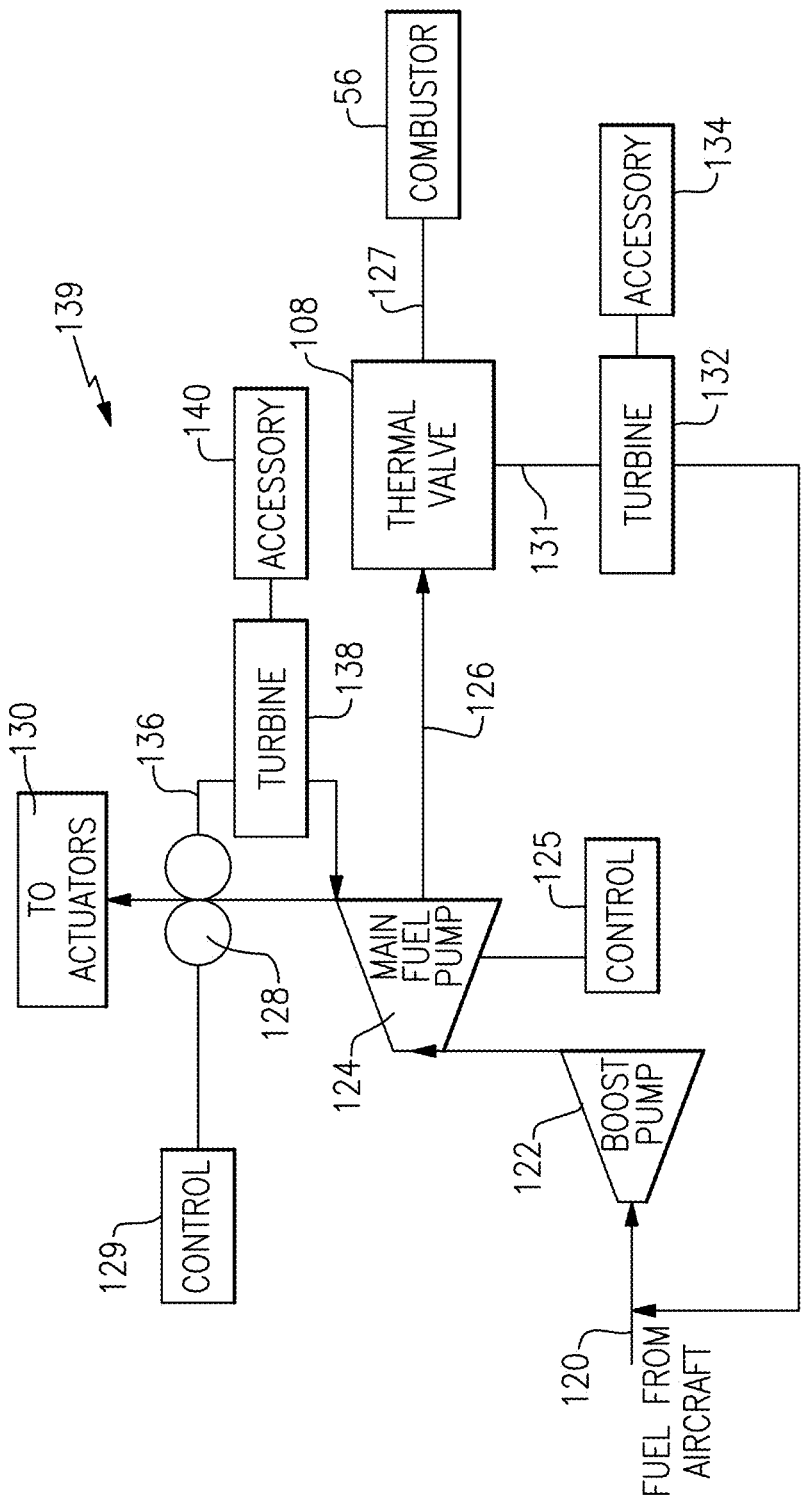
FIG. 4 shows another arrangement under this disclosure.

FIG. 4 shows a more detailed system 139 wherein fuel is again supplied through a line 120 to a boost pump 122. A main fuel pump 124 receives this fuel and has a control 125. The fuel is delivered to a temperature responsive valve 108 which dumps fuel back to the boost pump 122 if the fuel exceeds a particular temperature. The return fuel in line 131 passes across a turbine 132 which generates power for an accessory 134. Fuel downstream of the valve 108 passes into a line 127 and to the combustor 56.

Fuel downstream of the main pump 124 is also delivered to an actuator fuel pump 128 having a control 129. The fuel is delivered to a plurality of actuators 130, such as an actuator for a variable guide vane.

The fuel in a return line 136 passes across a turbine 138 which drives another accessory 140.

The main fuel pump 124 and actuator fuel pump 128 are sized and controlled to have excess margin that can be utilized to provide power to the turbines 132 and 138, and drive the accessories 134 and 140.

Figure 5:
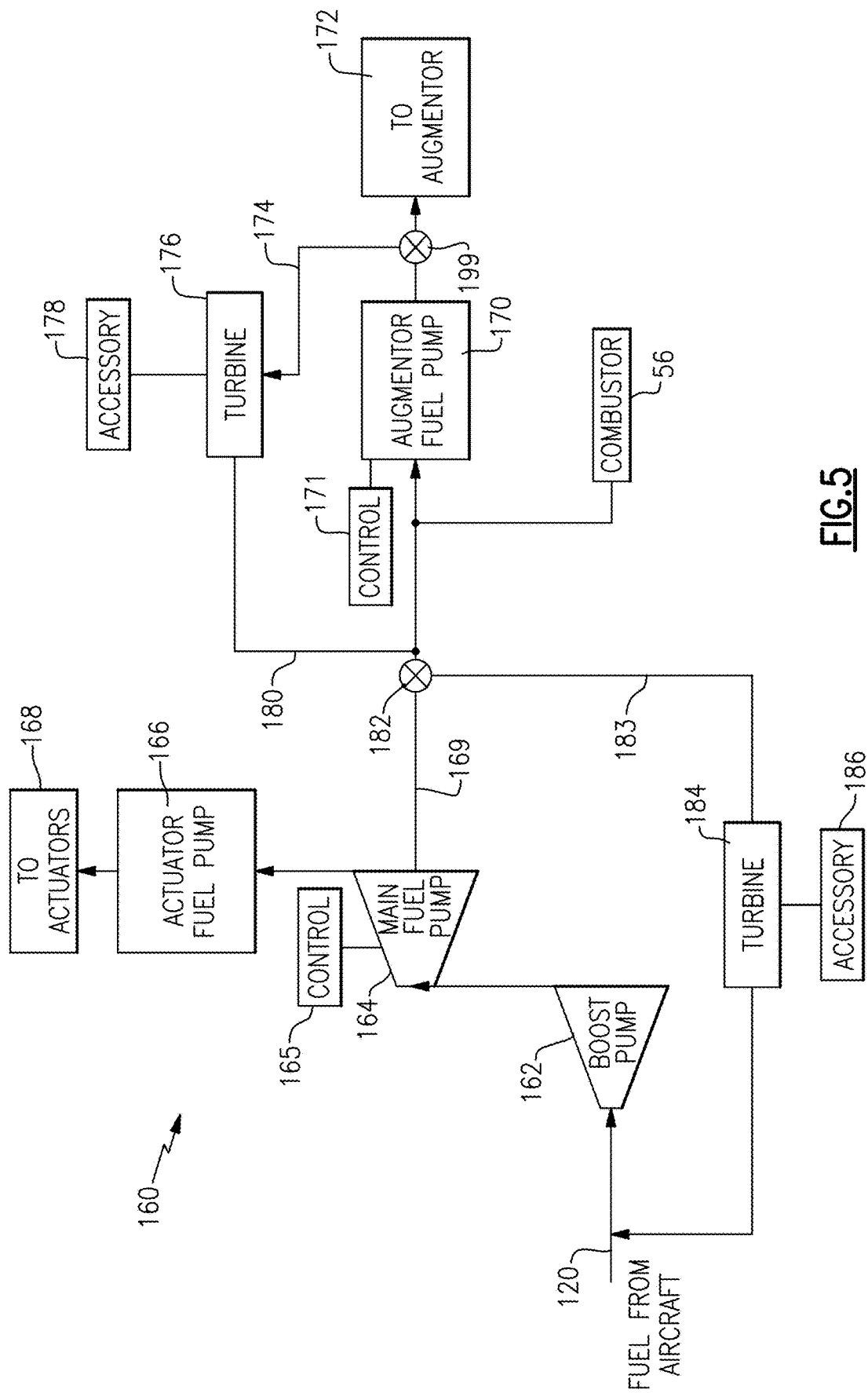
FIG. 5 shows an arrangement that may be utilized in the FIG. 1B engine.

FIG. 5 shows a system 160, which may be used with the FIG. 1B type engine. Fuel is delivered from a tank to line 120, and then to a boost pump 162. The fuel then passes to a main fuel pump 164 having a control 165. The fuel from the main fuel pump 164 may be delivered to an actuator fuel pump 166, and then to actuators 168.

Another line 169 from the main fuel pump 164 passes through a valve 182, and to the combustor 56. A valve 182 recirculates some fuel into a return line 183 such that it passes across a turbine 184 which drives an accessory 186.

As shown, the fuel downstream of the valve 182 is also delivered to an augmenter fuel pump 170. Motor control 171 controls the augmenter fuel pump 170. Fuel downstream of the augmenter fuel pump is delivered to an augmenter 172 as shown in FIGS. 1B and 1C. However, a valve 199 may return a portion, or all, of that fuel into a return line 174, and across a turbine 176 which powers an accessory 178.

An augmenter fuel pump 170 is typically used only intermittently, and under this disclosure the control 171 is modified to drive the augmenter fuel pump 170 closer to constant, or even constantly, to provide additional return fuel to line 174. That is, it may be driven with no fuel being delivered to augmenter 172.

The accessory 178 in this embodiment may be a weapon system. Other accessory systems may also be usefully added. Also, radar, threat detection or forms of electronic warfare will require additional power draws and can be powered by the teachings of this disclosure.

The accessories in the embodiments of FIGS. 2B and 3-5 may all be accessories which have been added since the design of the engine. In that sense they are retrofit.

The turbine may generate electricity to power the added accessories or may drive the accessories directly.

The motor controls disclosed across all of these embodiments may actually be part of a FADEC.

Figure 6:
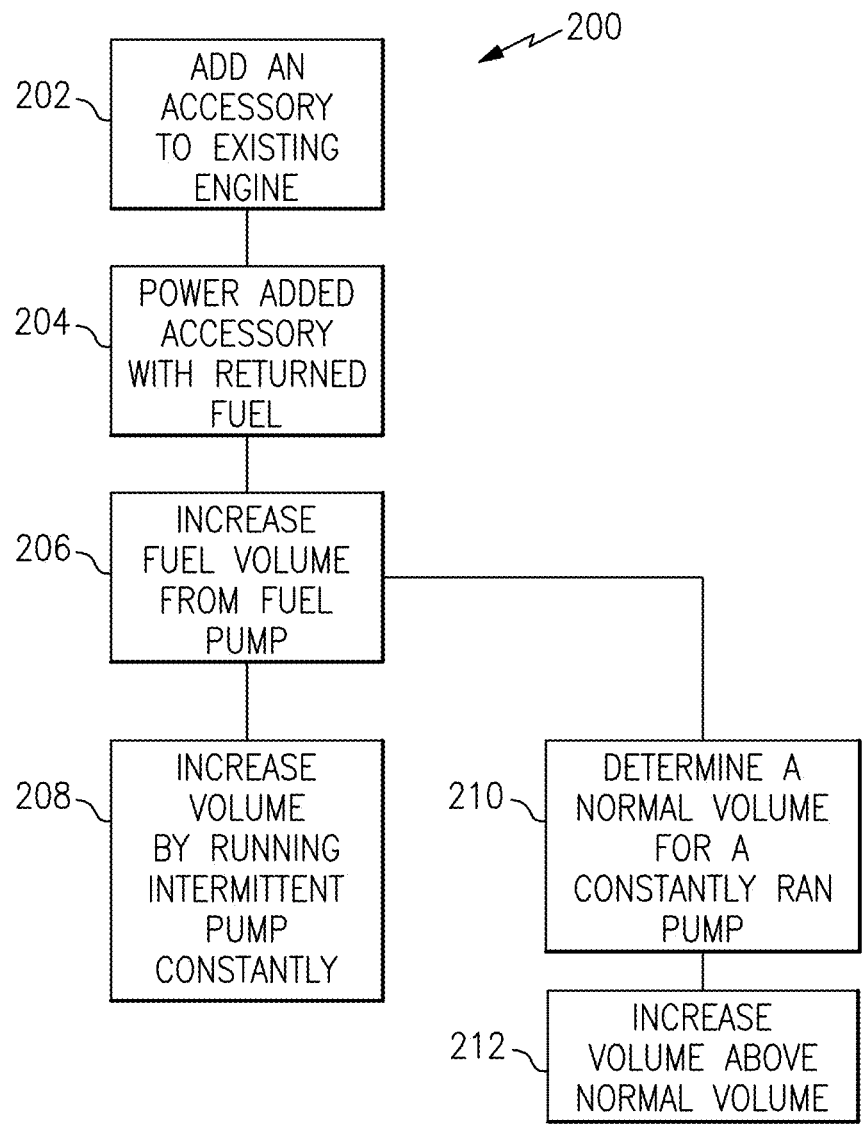
FIG. 6 shows a flow chart.

FIG. 6 shows a flow chart 200 of a method of retrofitting an existing engine under this disclosure. At step 202, a decision is made to add an accessory to an existing engine.

At step 204, a fuel supply for the system is modified to provide hydraulic power for the added accessory with returned fuel.

At step 206, a fuel volume and/or pressure from a fuel pump may be increased to provide additional fuel to provide the power of step 204.

At step 208 there is increased power from the fuel achieved by running an intermittent pump, such as the augmenter pump, constantly.

At step 210, a normal volume and/or pressure for a constantly ran pump may be determined for a particular condition for the gas turbine engine, or an associated aircraft.

As is known, each of the fuel pumps have a normal schedule of volume and pressure to be delivered under certain conditions. At step 212, the controls are modified away from the existing schedule to increase volume and/or pressure above that normal schedule.

As an example, at takeoff the difference in parasitic horsepower loss from all the accessories compared to the parasitic horsepower loss at cruise may be >250 hp. Thus, when not in takeoff condition there is this additional power that the control can use from the high spool shaft. At cruise the parasitic horsepower loss for all the accessories could be >100 hp. During a high thrust or high augmentation power from the shaft could be >400 hp. Thus, at a normal cruise point the system would have available this additional 300 hp.

This additional horsepower could be sufficient to power any number of additional accessories.

A retrofit gas turbine engine under this disclosure could be said to include a compressor, a combustor and a turbine. A tie shaft is connected to rotate by the turbine, and provides rotational drive into a gearbox. At least one fuel pump is connected to be driven by the gearbox. The at least one fuel pump delivers fuel downstream toward the combustor, and also has a return line. An added accessory turbine is positioned on the return line, and drives an added accessory which has been retrofit added to an existing gas turbine engine.

A gas turbine engine under this disclosure could be said to include a compressor, a combustor and a turbine. A tie-shaft is connected to rotate by the turbine, and provides drive into a gearbox. At least one fuel pump is connected to be driven by the gearbox. The at least one fuel pump delivers fuel downstream toward the combustor and also has a return line. A full authority digital electronic controller ("FADEC") receives electrical power from a first alternator. An alternator turbine is positioned on the return line and drives a second alternator which also supplies electric power to the FADEC.

A method of retrofitting an existing gas turbine engine under this disclosure could be said to include the steps of 1) determining a need for an additional accessory to be added to an existing gas turbine engine and 2) modifying a fuel supply system for the existing gas turbine engine such that a return line downstream of a fuel pump in the fuel supply system returns fuel across an added accessory turbine to drive the added accessory.

Although embodiments have been disclosed, a worker of skill in this art would recognize that modifications would come within the scope of this disclosure. For that reason, the following claims should be studied to determine the true scope and content of this disclosure.

What is claimed is:

1. A retrofit gas turbine engine comprising:
   a compressor, a combustor and a turbine;
   a tie shaft connected to rotate by the turbine, and provide rotational drive into a gearbox, at least one fuel pump connected to be driven by the gearbox;
   the at least one fuel pump for delivering fuel downstream toward the combustor, and also having a return line; and
   an added accessory turbine positioned on the return line, and for driving an added accessory which has been retrofit added to an existing gas turbine engine.

2. The gas turbine engine as set forth in claim 1, wherein the gas turbine engine is controlled by a full authority digital electronic controller ("FADEC"), the gearbox connected for driving a first alternator to supply electric power to the FADEC, and the added accessory being a hydraulically driven second alternator to supply additional electric power to the FADEC.

3. The gas turbine engine as set forth in claim 1, wherein the gas turbine engine further including an augmenter, and the at least one fuel pump includes an augmenter fuel pump to deliver fuel to the augmenter, with the return line positioned downstream of the augmenter fuel pump to return fuel across the added accessory turbine to drive the added accessory.

4. The gas turbine engine as set forth in claim 3, wherein the added accessory is a weapon system.

5. The gas turbine engine as set forth in claim 3, wherein the augmenter fuel pump is ran intermittently and a control for the augmenter fuel pump is modified to provide fuel when the augmenter is not being ran such that the return line downstream of the augmenter fuel pump can power the added accessory turbine and the added accessory.

6. The gas turbine engine as set forth in claim 5, wherein the augmenter fuel pump is ran constantly.

7. The gas turbine engine as set forth in claim 1, wherein the at least one fuel pump includes a main fuel pump, and an actuator fuel pump for supplying pressurized fuel to actuators associated with the gas turbine engine, and the actuator fuel pump having the return line passing through the added accessory turbine to in turn drive the added accessory.

8. The gas turbine engine as set forth in claim 7, wherein the actuator fuel pump is a gear pump.

9. The gas turbine engine as set forth in claim 1, wherein a thermal recirculation valve recirculates fuel into the return line if a temperature of the fuel exceeds a desired level.

10. The gas turbine engine as set forth in claim 1, wherein the at least one fuel pump is driven constantly, and a control for the at least one fuel pump has a schedule of volume and pressure values for the fuel to be supplied toward the combustor based upon a condition of an associated aircraft, and the control is modified to provide excess fuel above the schedule values.

11. A gas turbine engine comprising:
a compressor, a combustor and a turbine;
a tie-shaft connected to rotate by the turbine, and to provide drive into a gearbox, at least one fuel pump connected to be driven by the gearbox, the at least one fuel pump for delivering fuel downstream toward the combustor and also having a return line;
a full authority digital electronic controller ("FADEC") receiving electrical power from a first alternator; and
an alternator turbine positioned on the return line and driving a second alternator which also supplies electric power to the FADEC.

12. A method of retrofitting an existing gas turbine engine comprising the steps of:
1) Determining a need for an additional accessory to be added to an existing gas turbine engine;
2) Modifying a fuel supply system for the existing gas turbine engine such that a return line downstream of a fuel pump in the fuel supply system returns fuel across an added accessory turbine to drive the additional accessory.

13. The method as set forth in claim 12, wherein the existing gas turbine engine is controlled by a full authority digital electronic controller ("FADEC"), and a gearbox driving a first alternator supplying electric power to the FADEC, and the additional accessory being a hydraulically driven second alternator supplying additional electric power to the FADEC.

14. The method as set forth in claim 12, wherein the gas turbine engine further including an augmenter, and an augmenter fuel pump to deliver fuel to the augmenter, with the return line positioned downstream of the augmenter fuel pump, and returning fuel across the added accessory turbine to drive the additional accessory.

15. The method as set forth in claim 14, wherein the additional accessory is a weapon system.

16. The method as set forth in claim 14, wherein the augmenter is ran intermittently and a control for the augmenter fuel pump is modified to provide fuel when the augmenter is not being used such that the return line powers the added accessory turbine and the additional accessory.

17. The method as set forth in claim 16, wherein the augmenter fuel pump is ran constantly.

18. The method as set forth in claim 12, wherein the fuel pump includes a main fuel pump, and an actuator fuel pump supplying pressurized fuel to actuators associated with the gas turbine engine, and the actuator fuel pump having the return line passing across the added accessory turbine to in turn drive the additional accessory.

19. The method as set forth in claim 12, wherein the fuel pump is driven constantly, and a control for the fuel pump has an original schedule of volume and pressure for the fuel to be supplied toward the combustor based upon a condition of an associated aircraft, and the control is modified to provide excess fuel above the schedule values.

20. The method as set forth in claim 12, wherein a thermal recirculation valve recirculates fuel into the return line if a temperature of the fuel exceeds a desired level.

* * * * *